United States Patent
Gonzalez Alemany et al.

(10) Patent No.: US 9,758,352 B2
(45) Date of Patent: Sep. 12, 2017

(54) TURNING SYSTEM FOR BELT TRANSPORT SYSTEM

(71) Applicant: THYSSENKRUPP ELEVATOR INNOVATION CENTER, S.A., Gijon (ES)

(72) Inventors: Miguel Angel Gonzalez Alemany, Oviedo (ES); José Mendiolagoitia Juliana, Gijon (ES); Juan Domingo Gonzalez Pantiga, Gijon (ES); José Ojeda Arenas, Gijon (ES); Francisco Palomero Cocho, Gijon (ES); Aurelio Castaño Lantero, Langreo (ES); Eduardo Moran Garcia, Gijon (ES); Pedro Ros Zuazua, Oviedo (ES); Luis Joaquin Fernandez Alvarez, Oviedo (ES); Alberto Florez Castro, Lugo de Llanera (ES)

(73) Assignee: ThyssenKrupp Elevator Innovation Center, S.A., Gijon (Asturias) (ES)

( * ) Notice: Subject to any disclaimer, the term of this patent is extended or adjusted under 35 U.S.C. 154(b) by 6 days.

(21) Appl. No.: 14/655,419

(22) PCT Filed: Dec. 3, 2013

(86) PCT No.: PCT/EP2013/075347
§ 371 (c)(1),
(2) Date: Jun. 25, 2015

(87) PCT Pub. No.: WO2014/102040
PCT Pub. Date: Jul. 3, 2014

(65) Prior Publication Data
US 2015/0336773 A1    Nov. 26, 2015

(30) Foreign Application Priority Data

Dec. 27, 2012 (ES) .................................. 201232035

(51) Int. Cl.
*B66B 21/10* (2006.01)
*B66B 23/00* (2006.01)
(Continued)

(52) U.S. Cl.
CPC ............ *B66B 21/10* (2013.01); *B65G 17/065* (2013.01); *B65G 17/066* (2013.01); *B65G 17/22* (2013.01);
(Continued)

(58) Field of Classification Search
None
See application file for complete search history.

(56) References Cited

U.S. PATENT DOCUMENTS 3,939,959 A   2/1976  Dunstan et al.
3,964,596 A   6/1976  Heusler et al.
(Continued)

FOREIGN PATENT DOCUMENTS

CN    1224403 A    7/1999
FR    567615       3/1924

OTHER PUBLICATIONS

PCT International Search Report mailed Mar. 24, 2014 for PCT International Application No. PCT/EP2013/075347, 3 pages.
(Continued)

*Primary Examiner* — Kavel Singh
(74) *Attorney, Agent, or Firm* — RMCK Law Group, PLC

(57) ABSTRACT

A turning system for a belt transport system, wherein the belt of the same is formed by a plurality of pallets and the transport system has a turn input stretch and a turn output stretch, arranged on the same horizontal plane. The turning system has a curved stretch, which connects the turn input and output, the curved stretch being arranged on the same horizontal plane as the turn input and output.

4 Claims, 5 Drawing Sheets

(51) Int. Cl.
*B66B 23/02* (2006.01)
*B65G 23/14* (2006.01)
*B65G 17/06* (2006.01)
*B66B 23/14* (2006.01)
*B65G 17/22* (2006.01)

(52) U.S. Cl.
CPC ............ *B66B 23/02* (2013.01); *B66B 23/026* (2013.01); *B66B 23/147* (2013.01)

(56) References Cited

U.S. PATENT DOCUMENTS

| | | | |
|---|---|---|---|
| 5,042,648 A | 8/1991 | Garvey | |
| 5,394,978 A | 3/1995 | Majewski et al. | |
| 6,640,957 B2 * | 11/2003 | Fargo | B66B 21/10 198/321 |
| 7,588,140 B2 * | 9/2009 | van den Goor | B65G 17/066 198/831 |
| 8,104,600 B2 * | 1/2012 | Sanchez Pineiro | B66B 21/08 198/333 |
| 2008/0223697 A1 | 9/2008 | Van Der Goor | |

OTHER PUBLICATIONS

Chinese Office Action for Chinese Application No. 201380068819.5 dated May 5, 2016, 7 pages.
Spanish Search Report for Spanish Application No. 201232035 dated Apr. 3, 2013, 4 pages.

* cited by examiner

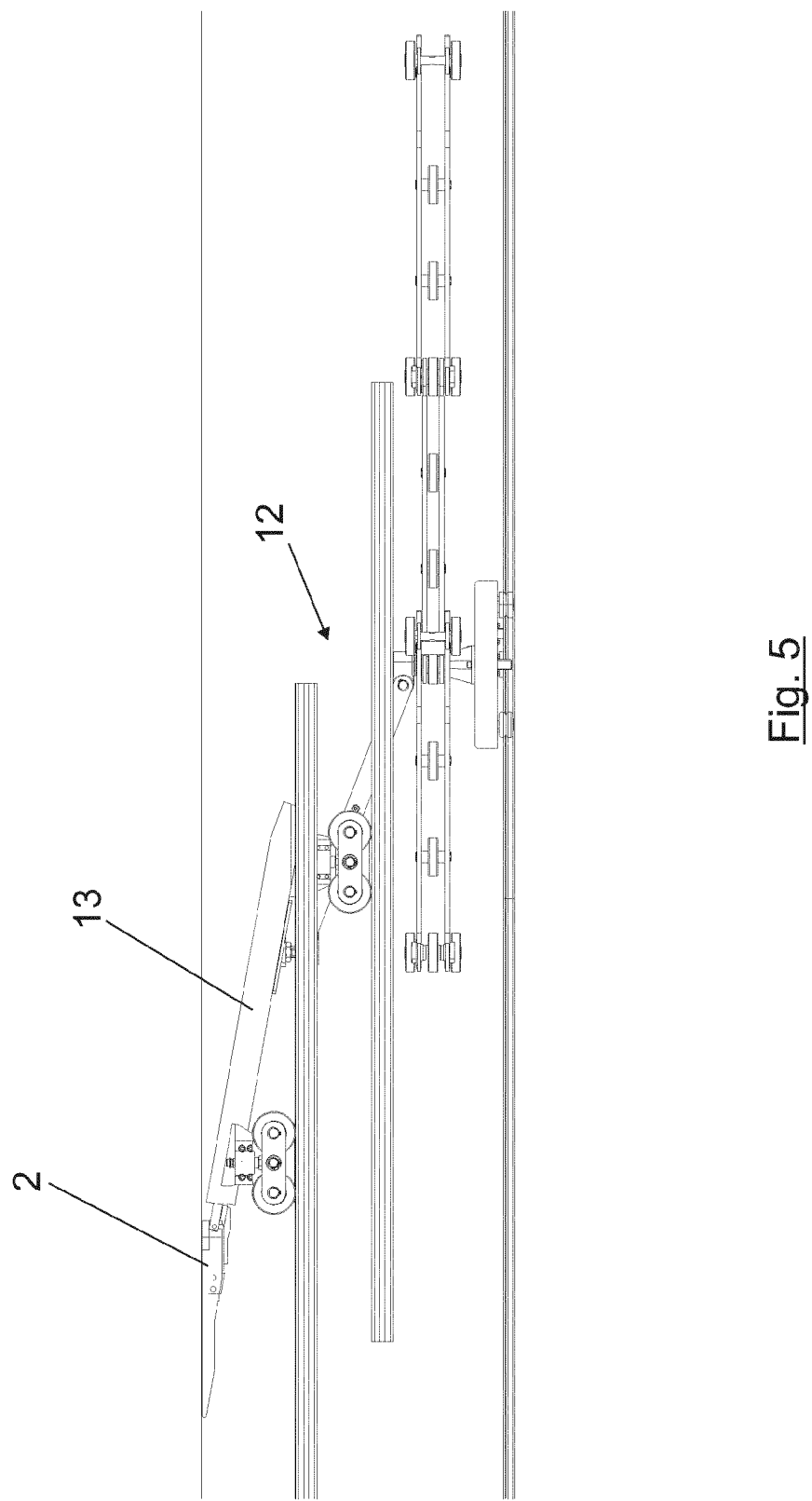

TURNING SYSTEM FOR BELT TRANSPORT SYSTEM

CROSS-REFERENCE TO RELATED APPLICATIONS

This application is a 371 U.S. National Stage of International Application No. PCT/EP2013/075347, filed Dec. 3, 2013, which claims priority to Spanish Application No. P201232035 filed on Dec. 27, 2012. The disclosure of each of the above applications is incorporated herein by reference in their entirety.

FIELD

The present disclosure pertains to the technical field of platforms and passageways for the transportation of people and goods, specifically to belts formed by pallets and more specifically to turning systems that employ said pallet belts in order to change the travelling direction. The object of the present disclosure is a turning system for these belt transport systems, in which said turning is carried out horizontally by means of a curved stretch arranged on the same horizontal plane as that formed by the turn input stretch and the turn output stretch.

BACKGROUND

In passageways or platforms used to transport people and goods and specifically those which consist of belts formed by pallets, it is necessary to turn these pallets in order to successfully change the travelling direction of the belt. For example, passageways used to transport people in a linear fashion travel in both possible directions. In this case, when the end of the track is reached in one direction, the pallets of the belt should turn around in order to continue moving forwards in the other direction.

Up until present, this turn was carried out vertically, in such a way that the two forwards directions of the belt made of pallets were made at two different heights. In other words, a forwards outward movement is produced in one direction and at the end of the forwards course, the vertical turn is produced and the return is produced at a lower level.

Documents U.S. Pat. No. 3,939,959 and U.S. Pat. No. 4,276,976 show passageways or platforms for transporting people or goods, in which the platform moves forwards in one direction and at the end of the forwards moving trajectory, the vertical turn is produced and the platform returns in the opposite direction at a different height, in this case specifically at an upper height, although it is perfectly possible for it to return at a lower height.

Spanish patent application ES2294972, filed by the same applicant as the present application, shows a turning system for passageways or pallet belts of the above described variety.

These systems are disadvantageous in that quite a considerable trench depth is required in order to be able to house the entire system on two different levels.

A system which successfully and efficiently turned the pallets around in a belt was therefore desirable, which would thus prevent the disadvantages existing in systems pertaining to the prior art.

SUMMARY

The present disclosure resolves the problems existing in the state of the art by means of a turning system for belt transportation systems, of the variety in which the belt is formed by an assembly of pallets.

The transport system has a turn input and a turn output, arranged on the same horizontal plane.

The turning system has a curved stretch, which connects the turn input to the turn output and is arranged on the same horizontal plane as this turn input and output.

The curved stretch of the turning system is particularly formed by an external guide, corresponding to the external guide of the turn input and turn output and by an internal guide corresponding to the internal turn input and output of the same, in such a way that the pallets of the belt are arranged between the external and internal guides and are displaced between them.

The turning system may have a central chain to which the pallets are joined and which drives the same along their course of the curved stretch. This central chain is arranged between the external guide and the internal guide of the curved stretch and preferably on a horizontal plane which is slightly lower than the horizontal plane on which the external and internal guides of the curved stretch are found. In this case, the central chain may in turn be driven by a drive wheel which is coplanar to it, although other alternative driving means may also exist.

Alternatively, in order to successfully move the pallets, rather than having the central chain, the turning system has a central guide, which is arranged between the external guide and the internal guide of the curved stretch, arranged on a horizontal plane which is slightly lower than that formed by the external and internal guides of the curved stretch. A number of carts are displaced along the length of this central guide, each one of which is fixed to a pallet on the belt, in such a way that the carts drag the pallets along the length of the curved stretch. In this case, the central guide remains fixed and it is the carts that travel along the length of the same, preferably dragged by linear motors.

In this way, a horizontal turn is achieved, which is more advantageous than the vertical turning systems existing in the state of the art for various reasons. Firstly the entire length of the belt is used, there being two useful directions, i.e. when transporting both goods and passengers, it is possible to use both directions, both the outgoing and return direction, at the same level. Furthermore, the required depth of the trench which houses the belt system with the turn is not as great, since it is not necessary to house two levels of belt or the vertical system, thereby facilitating the installation and maintenance of the system.

BRIEF DESCRIPTION OF THE DRAWINGS

In order to facilitate understanding of the invention, below is a series of drawings which refer to the same and provide a non-limiting example thereof.

FIG. 5 is a profile view of the cart joined to the pallet shown in the previous figure.

Figure 1:
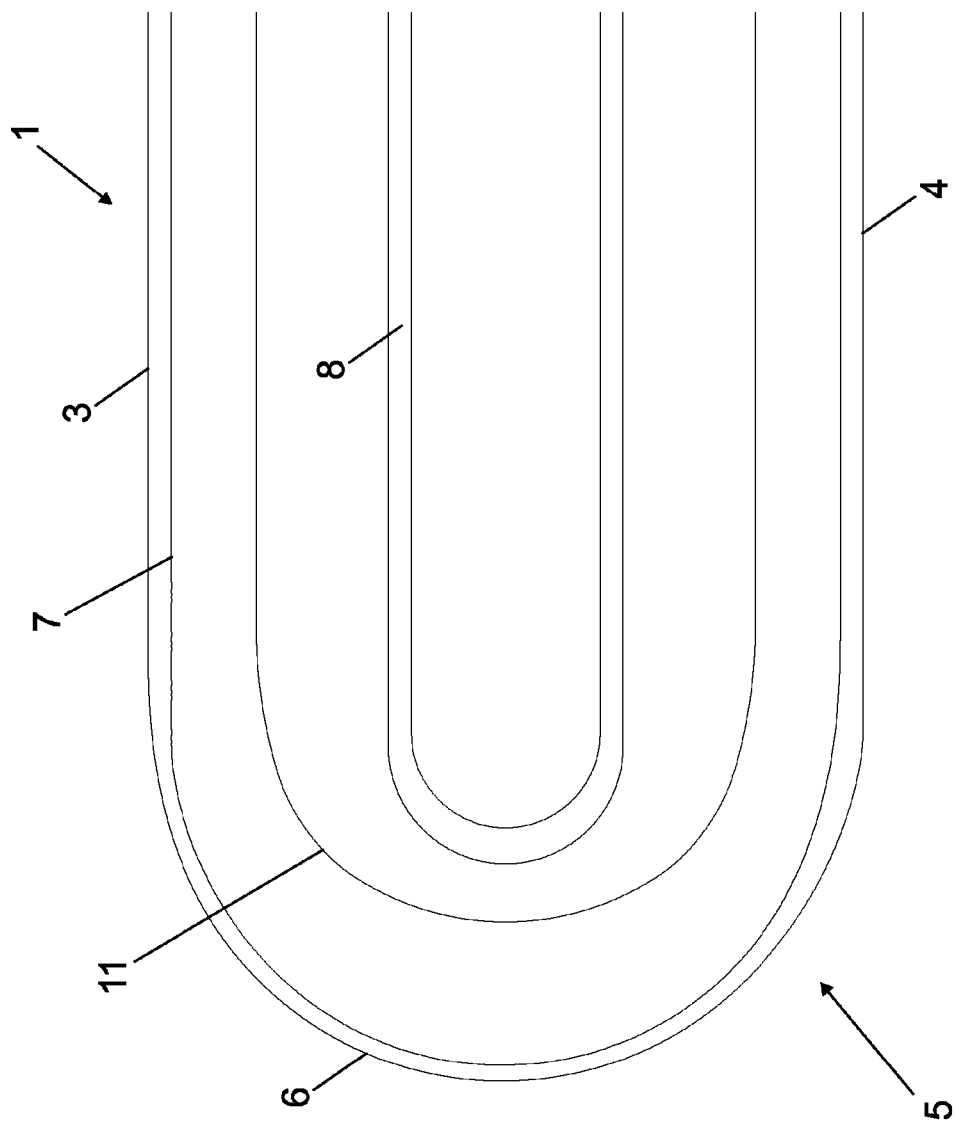
FIG. 1 is a schematic representation of the curved stretch of the horizontal turning system, object of the present invention.
Figure 2:
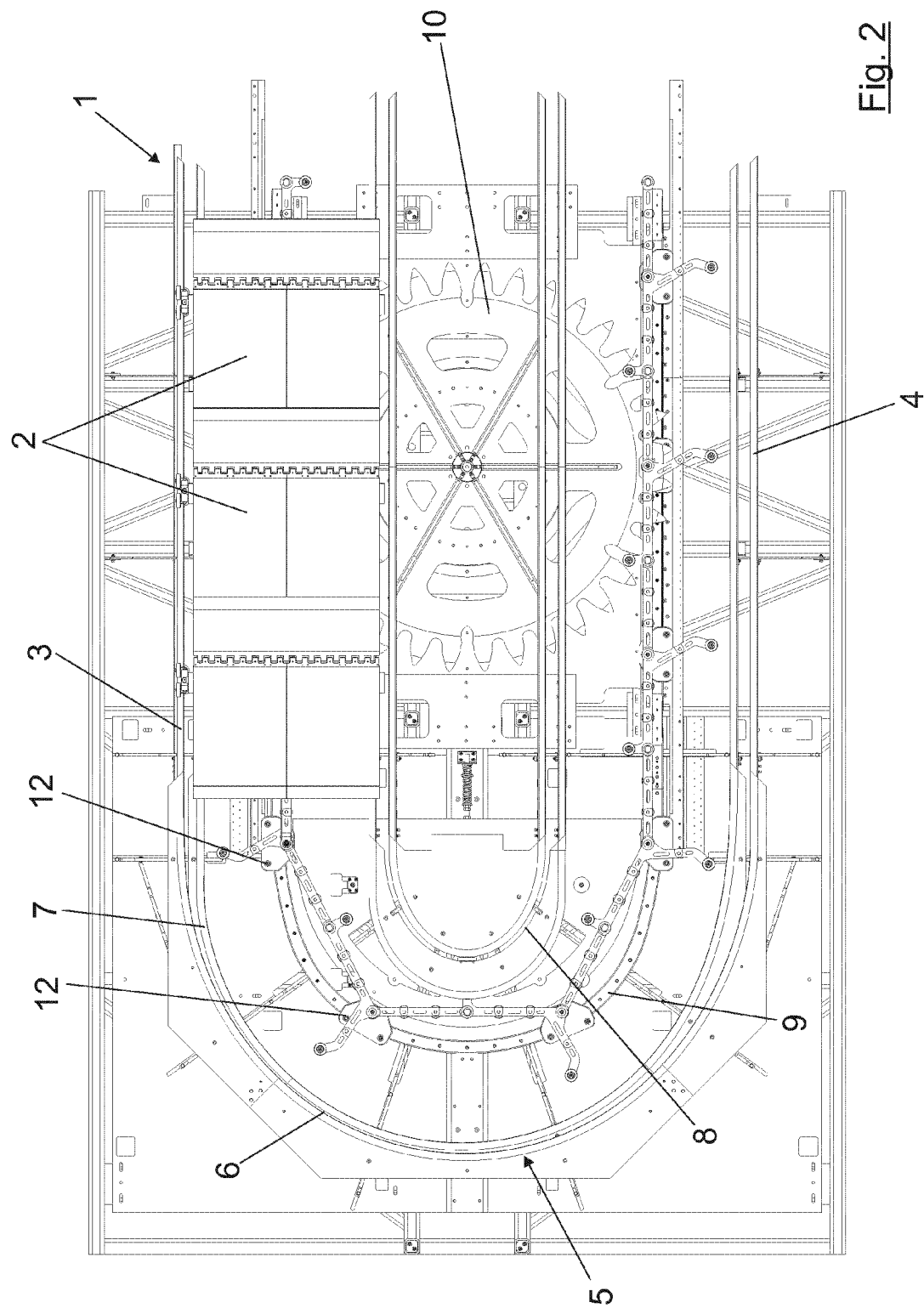
FIG. 2 represents an embodiment of the turning system, object of the present invention.
Figure 3:
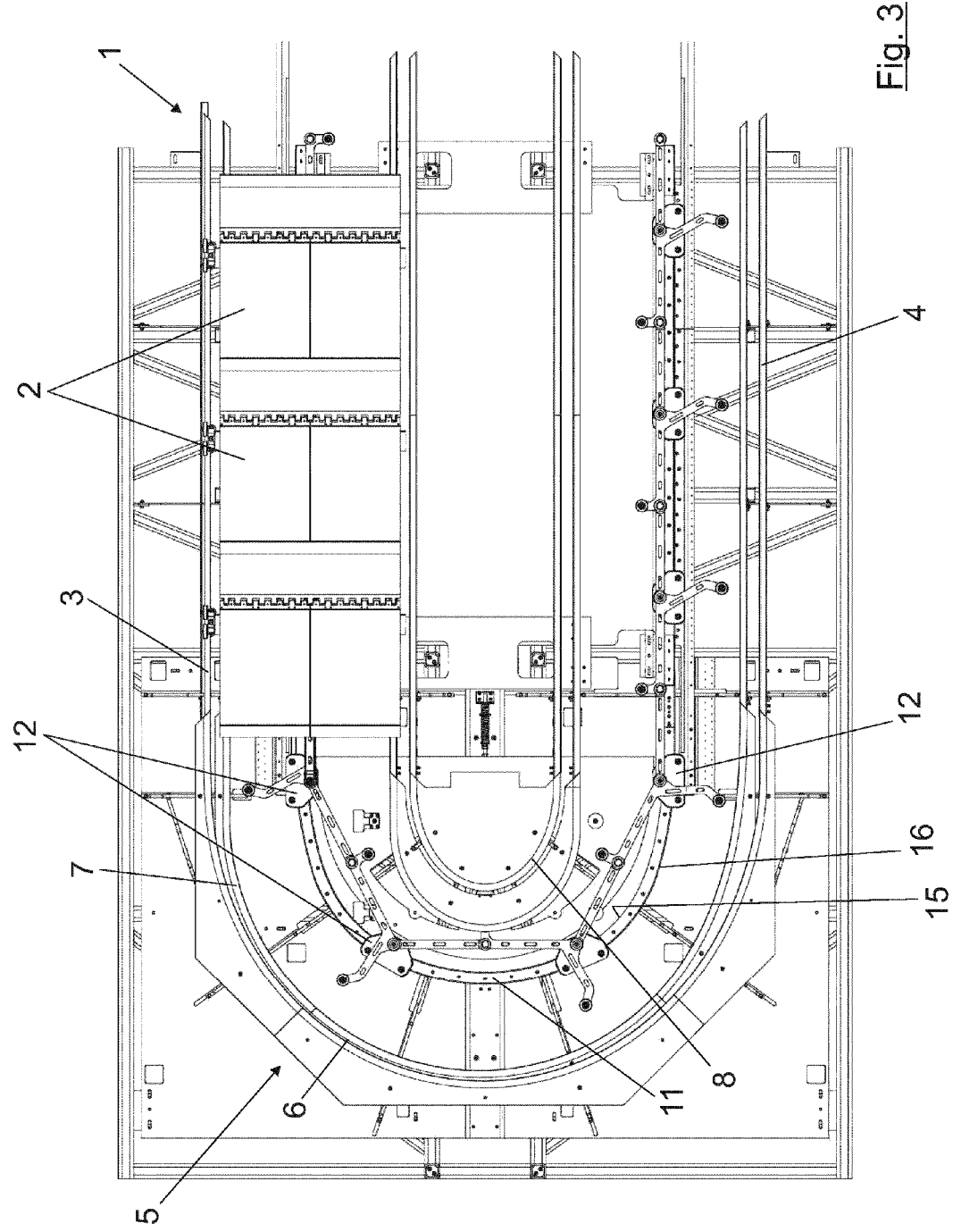
FIG. 3 represents an alternative embodiment of the turning system, object of the present invention.
Figure 4:
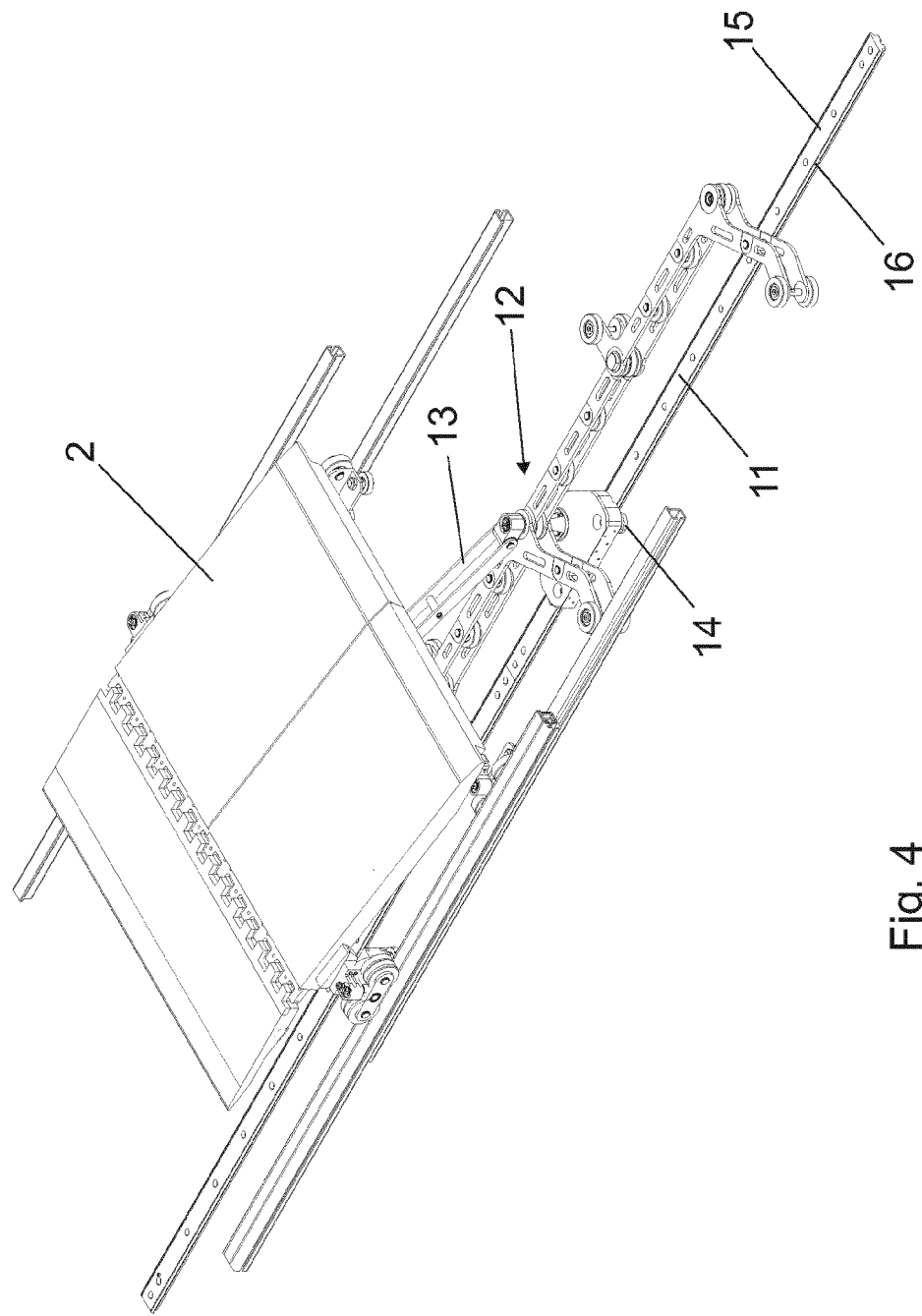
FIG. 4 represents an embodiment of a cart used in an embodiment of the turning system, joined to a pallet.

In these figures, reference is made to an assembly of elements, which are as follows:

1. Transport system belt
2. Belt pallets
3. Transport system turn input
4. Transport system turn output
5. Turning system
6. Curved stretch of the turning system
7. External guide of the curved stretch
8. Internal guide of the curved stretch
9. Central chain
10. Drive wheel of the central chain
11. Central guide
12. Turning system carts
13. Arm joining the carts to the pallets
14. Cart wheels
15. Internal face of the central guide
16. External face of the central guide

DETAILED DESCRIPTION

The object of the present invention is a turning system for a belt transport system 1, of the variety formed by a plurality of pallets 2. The transport system has a turn input 3 and a turn output 4, arranged on the same horizontal plane. The turning system 5 has a curved stretch 6, which connects the turn input 3 to the turn output 4. This curved stretch 6 is arranged on the same horizontal plane as the turn input 3 and as the turn output 4.

According to a specific embodiment of the invention, the curved stretch 6 of the turning system 5 is formed by an external guide 7, corresponding to the external guide of the turn input 3 and the turn output 4 and by an internal guide 8 corresponding to the internal guide of the turn input 3 and the turn output 4, in such a way that the pallets 2 of the belt 1 are arranged between the external guides 7 and internal guides 8, being displaced along the length of the curved stretch 6 between the same.

In order to achieve this movement of the pallets 2 along the length of the curved stretch 6, the turning system 5 may have a central chain 9 to which the pallets 2 are joined and which drives the same in their journey. This central channel 9 is arranged between the external guide 7 and the internal guide 8 of the curved stretch 6. According to this embodiment and in a preferred way, the central channel 9 is arranged on a horizontal plane which is lower to the plane formed by the external guide 7 and the internal guide 8 of the curved stretch 6. This central chain 9 is in turn driven by a drive wheel 10, which is coplanar to said central chain 9, although there may also be alternative ways to drive the central chain 9.

An alternative way to successfully move the pallets 2 along the length of the curved stretch 6 is by means of a central guide 11 arranged between the external guide 7 and the internal guide 8, in such a way that it is also arranged on a horizontal plane which is slightly lower than the plane formed by the external 7 and internal 8 guides of the curved stretch 6. A number of carts 12 are displaced along the length of this central guide 11, each one of which is fixed to a pallet 2 on the belt 1. These carts 12 drag the pallets 2 along the curved stretch 6, whilst the carts 12 are displaced along the length of the central guide 11, preferably being dragged by linear motors, although any other means may be used.

According to a preferred embodiment of the carts 12, the same are joined to the lower face of the pallets 2 by means of a joining arm 13.

Likewise, according to a preferred embodiment of the invention, the carts 12 are joined to the central guide 11 and are displaced along the length of the same by means of a wheel 14 arranged on the internal face 15 of the central guide 11 and two wheels 14 arranged on the external face 16 of said central guide 11. Alternatively, the carts 12 may be joined to the central guide 11 and be displaced along the length of the same by means of four or more wheels.

After having described the invention clearly, it must be noted that details of the specific embodiments described above may be amended, provided that these amendments do not change the fundamental principle and essence of the invention.

The invention claimed is:

1. A turning system for a belt transport system, the belt being of the variety formed by a plurality of pallets, the transport system comprising a turn input and a turn output, arranged on the same horizontal plane, the turning system also comprising a curved stretch, which connects said turn input and said turn output, said turning system is characterised in that the curved stretch is arranged on the same horizontal plane as the turn input and turn output, the curved stretch further comprising:
   an external guide corresponding to the external guide of the turn input and turn output;
   an internal guide corresponding to the internal guide of the turn input and turn output, the pallets of the belt being arranged between the external and internal guides, and
   wherein the turning system comprises:
   a central guide arranged between the external guide and the internal guide of the curved stretch on a horizontal plane lower than the plane formed by said external and internal guides of the curved stretch, along the length of which a plurality of carts are displaced, each one of which is fixed to a pallet of the belt, which drag said pallets along the length of the curved stretch.

2. The turning system for a belt transport system of claim 1 wherein the carts are displaced along the length of the central guide, being dragged by linear motors.

3. The turning system for a belt transport system according to claim 2 wherein each one of the carts is joined to the central guide and displaced along the length the same by means of a wheel arranged on the internal face of the central guide and two wheels arranged on the external face of said central guide.

4. The turning system for a belt transport system according to claim 3 wherein the carts are joined to the lower face of the pallets by means of a joining arm.

* * * * *